United States Patent [19]
Beard et al.

[11] Patent Number: 5,386,255
[45] Date of Patent: Jan. 31, 1995

[54] MOTION PICTURE DIGITAL SOUND SYSTEM AND METHOD WITH PRIMARY SOUND STORAGE EDIT CAPABILITY

[75] Inventors: Terry D. Beard, Westlake Village; Joseph Dellaria, Agoura Hills; James S. Ketcham, Woodland Hills, all of Calif.

[73] Assignee: Digital Theater Systems, L.P., Westlake Village, Calif.

[21] Appl. No.: 928,956

[22] Filed: Aug. 12, 1992

Related U.S. Application Data

[63] Continuation-in-part of Ser. No. 620,825, Nov. 29, 1990, and a continuation-in-part of Ser. No. 842,789, Feb. 26, 1992, which is a continuation of Ser. No. 590,294, Sep. 28, 1990, abandoned.

[51] Int. Cl.⁶ .............................................. G03B 31/00
[52] U.S. Cl. .............................................. 352/5; 352/6; 352/10; 352/12; 352/20; 352/25; 352/31; 352/32; 352/236
[58] Field of Search ....................... 352/5, 6, 10, 12, 85, 352/236, 20, 25, 31, 32, 92, 237; 360/14.2, 14.3, 36.2; 364/239.1; 358/337, 339, 343

[56] References Cited

U.S. PATENT DOCUMENTS

| | | |
|---|---|---|
| 3,666,356 | 5/1972 | Williams . |
| 3,944,348 | 3/1976 | Freudenschuss ................. 352/5 |
| 3,999,842 | 12/1976 | Niederhauser et al. ............ 352/5 |
| 4,040,026 | 8/1977 | Gernelle ...................... 364/239.1 |
| 4,381,541 | 4/1983 | Baumann et al. ............... 364/239.1 |
| 4,385,814 | 5/1983 | Elliott ................................ 352/92 |
| 4,423,482 | 12/1983 | Hargrove et al. ............... 364/239.1 |
| 4,491,399 | 1/1985 | Bell ................................ 352/92 |
| 4,504,130 | 3/1985 | Bell et al. ......................... 352/92 |
| 4,527,233 | 7/1985 | Ambrosius et al. ............ 364/239.1 |
| 4,860,193 | 8/1989 | Bentley et al. .................. 364/239.1 |
| 4,893,921 | 1/1990 | Beauviala ........................ 352/92 |

FOREIGN PATENT DOCUMENTS

WO8504024 9/1985 WIPO .

Primary Examiner—Monroe H. Hayes
Attorney, Agent, or Firm—Koppel & Jacobs

[57] ABSTRACT

A digital sound system for motion picture films employs a digital time code on the film to trigger the transfer of sound data from a digital audio store to a FIFO memory. The digital audio data is read out from the FIFO memory and played back in the theater at a constant rate, with any jumps in the digital time code handled by making a corresponding jump within the digital audio store but not in the FIFO memory. Readout from the FIFO memory and clocking of the digital-to-analog converters (DACs) used for theater playback is synchronized to the AC mains that powers the theater projector, and thus allows for an uninterrupted audio playback even if time code entries on the film are obliterated. The FIFO memory need only have enough capacity to accommodate the maximum audio store access time, and can be quite small.

17 Claims, 6 Drawing Sheets

MOTION PICTURE DIGITAL SOUND SYSTEM AND METHOD WITH PRIMARY SOUND STORAGE EDIT CAPABILITY

REFERENCE TO PRIOR APPLICATIONS

This application is a continuation-in-part of application Ser. No. 07/620,825, filed Nov. 29, 1990, and of Ser. No. 07/842,789, filed Feb. 26, 1992; the latter application is in turn a continuation of Ser. No. 07/590,294, filed Sep. 28, 1990 and since abandoned.

BACKGROUND OF THE INVENTION

1. Field of the Invention

This invention relates to systems and methods for producing an audio signal in response to a digital time code on a motion picture film.

2. Description of the Related Art

Current motion picture films employ analog sound recording techniques. Most motion pictures use an analog optical sound track that is printed onto the film along with the picture, and is optically scanned to reproduce the sound. Another technique is to record the sound onto magnetic strips that are coated along the edges of the film; this process is used for example in producing "Dolby ® 70 mm Sound".

Optical sound tracks have a number of shortcomings. They are susceptible to distortion caused in the laboratory printing process, have a limited frequency and amplitude range, and are subject to damage and noise caused by wear and dirt accumulation. Magnetically recorded sound tracks are subject to noise problems similar to those encountered with other audio tapes. It would be highly desirable to upgrade the quality of motion picture sound to a level comparable to that achieved with a compact disk, through the use of a digital sound system.

Several attempts have been made to achieve a digital movie sound system. One approach has been to replace the analog sound track directly with a digital track by recording digital sound data in the area previously occupied by the analog track on the film. Although theoretically this approach could be used to yield a higher quality sound reproduction, it has proven difficult for film laboratories to reliably print the small bit size required to fit the amount of digital data needed in the restricted area available. There would also be a fairly low limit to the number of sound tracks that could be encoded onto the film. As a practical matter, this type of sound encoding is incompatible with the analog sound reproduction equipment available in most theaters, and would require the theater to have special dedicated sound equipment for the digital sound tracks. Any theater that wanted to run films with this type of digitally encoded sound track would thus have to have two separate sets of sound equipment, if they also wanted to be able to play films with conventional analog sound tracks. Conversely, the distribution of a film with such a digital sound track would be likely to suffer because it could not be run in a theater that had not added a digital sound capability.

Another approach has been to print the digital information in "unused" areas of the motion picture print, such as between the film's sprocket holes. With this approach it is also difficult to obtain reliable prints from the laboratory and to have them remain reliable during extended use in theaters; the sprocket hole areas of a film are particularly subject to wear.

An alternate approach is to record the digital sound data on a separate medium such as a laser disk, and to synchronize the digital sound source with the picture. An implementation of this approach has been to print a time code onto the film along with a normal analog sound track, and to use the time code to directly access the digital sound storage medium. This method does not take into account the fact that short pieces of film are sometimes removed because of film damage, leaving "jumps" or "edits" in the picture that the sound track must follow. However, an instantaneous jump in the digital audio is not possible from most digital audio sources, such as laser disks. Furthermore, maintaining a mechanical synchronization of a laser disk to a film is difficult.

The related application Ser. Nos. 07/620,825 and 07/842,789 attempt to resolve this problem by transferring the digital audio data from a permanent storage medium, such as a digital audio tape (DAT) or laser disk, to an intermediate fast access digital memory, and to then transfer data from the intermediate memory for conversion to analog and playback in the theater as needed. This technique permits virtually instantaneous jumps to be made in the audio playback to match film edits, and also provides a simpler synchronization without the need for a constant and accurate mechanical synchronization of the digital sound with the picture. However, it has the disadvantage of limiting the size of edit jumps that can be accommodated to the size of the intermediate digital buffer memory. Large jumps require a large memory, which significantly increases the cost of the system.

SUMMARY OF THE INVENTION

The present invention seeks to provide a digital sound system and method for motion picture films that operates from a digital time code on the film but requires less memory than in the related system described above, can accommodate edit jumps of virtually unlimited size, can accommodate missing time code entries, and eliminates the need to synchronize the readout from the buffer memory with the recognition of time code entries read from the film.

These goals are achieved by providing a digital time code on the film and storing the movie sound in a digital audio store, reading the time code from the film as it is advanced, and accessing the digital audio store to read out the digital sound data that corresponds to the time code that has been read. The digital sound data read from the audio store is loaded into a FIFO (first in, first out) digital memory; all of the sound data that is loaded into the FIFO memory is later read out from that memory at a rate that is synchronized to the film speed. The digital data from the FIFO memory is then converted to an analog format for theater playback.

A controller for the digital audio store has an access time that is less than the film travel time between the time code reader and the projector's picture projection aperture, while the digital audio store has a data output rate capability that is greater than the rate at which the digital sound data is read out from the FIFO memory to the system's digital-to-analog converters (DACs). This allows jumps in the film to be accommodated by making a corresponding jump within the digital audio store, without interrupting the regular readout of data previously entered into the FIFO memory. The FIFO memory is partially depleted during the time required to make a jump within the digital audio store, but is rapidly refilled when the digital sound signal that corresponds to the new time code has been accessed within the audio store. Unreadable time code entries can also be easily handled.

The theater motion picture projector is powered from an alternating current (AC) mains. A readout controller for the FIFO memory is preferably synchronized to the AC main signal, rather than to the time code read from the film. This allows the system to continue operating despite absent time code entries, such as those caused by physical obliteration, and also ensures a positive synchronization between the film advancement and sound readout rates. The synchronization between the AC mains and the FIFO memory controller may be implemented with a phase locked loop, which also provides a sampling clock signal for the DACs.

The controller for the digital audio store preferably includes a dynamic random access memory (RAM), within which the FIFO memory may be implemented. The digital audio store itself preferably comprises a compact disk read only memory (CD ROM), although other storage devices may also be used.

Further features and advantages of the invention will be apparent to those skilled in the art from the following detailed description, taken together with the accompanying drawings.

DETAILED DESCRIPTION OF THE INVENTION

The present invention can be used with various digital time code formats, and there are several possible ways to place the time code on the film. However, the preferred time code arrangement is that described in application Ser. Nos. 07/620,825 and 07/842,789, the contents of which are hereby incorporated by reference. This involves placing the time code in an area on the negative between the normal optical sound track and the picture. This area conventionally serves to isolate the optical sound track area from the picture, and is normally deliberately avoided when reading the sound track for playback. It lies within the area exposed by the laboratory sound track printing head, but outside the area exposed by the normal laboratory picture printing head. It is well outside the area scanned by the normal optical sound playback head on a projector, so that it does not interfere with the normal optical sound track.

Figure 1:
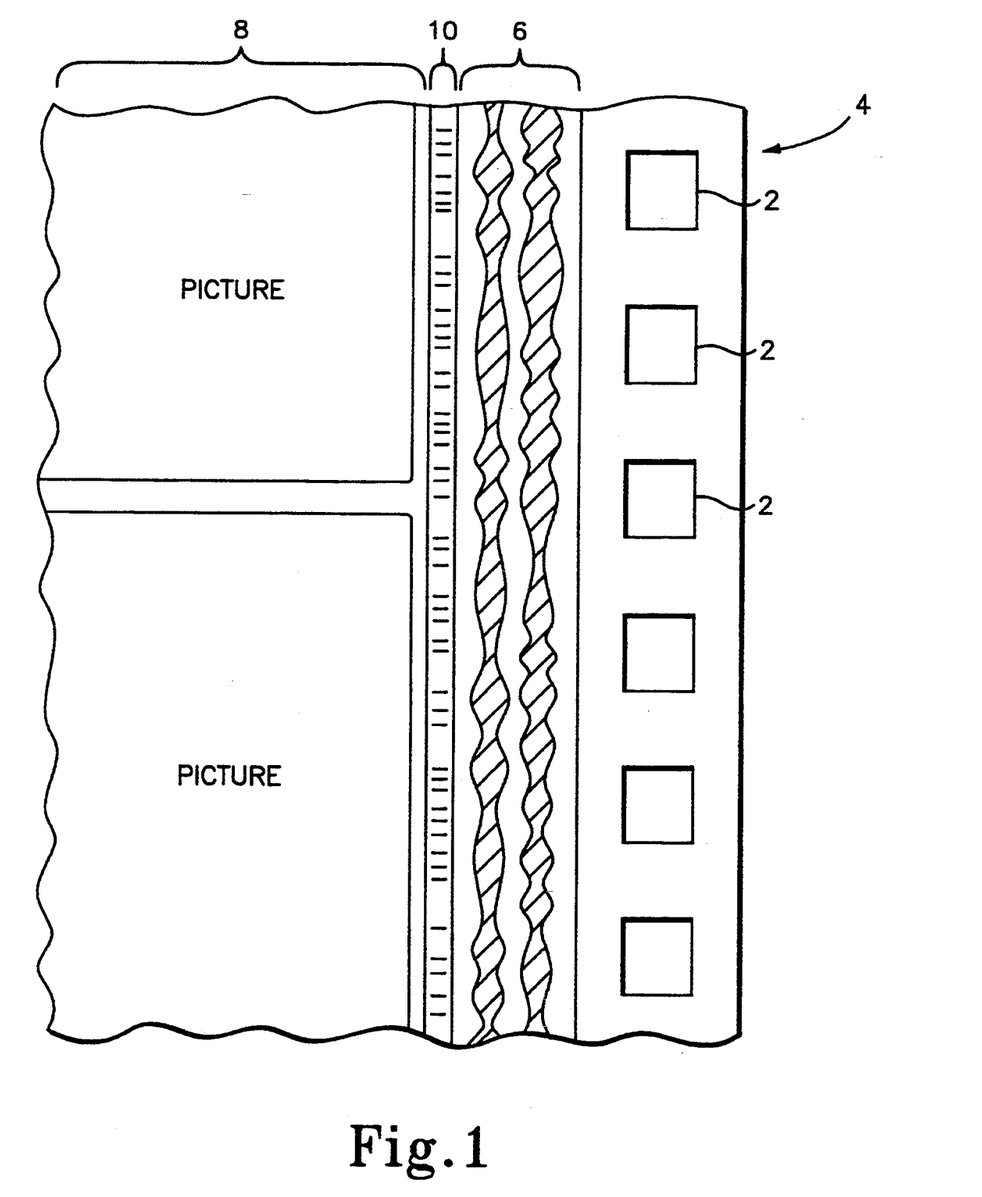
FIG. 1 is an enlarged fragmentary view of a motion picture film segment that includes both a conventional analog sound track, and a digital time code that can be used for the invention.

FIG. 1 shows a piece of 35 mm release motion picture film with a digital time code in this area. A series of sprocket holes 2 lie between the edge 4 of the film and the normal optical sound track area 6. The picture frames are printed by a picture printing head in an area 8 that is spaced inward from the sound track area 6. The intervening area 10 is used for the digital time code; this area is exposed by the normal laboratory sound track printing head, but not by the picture printing head. It is usually partially redeveloped by an application process after normal color processing but before the final fix.

Figure 2:
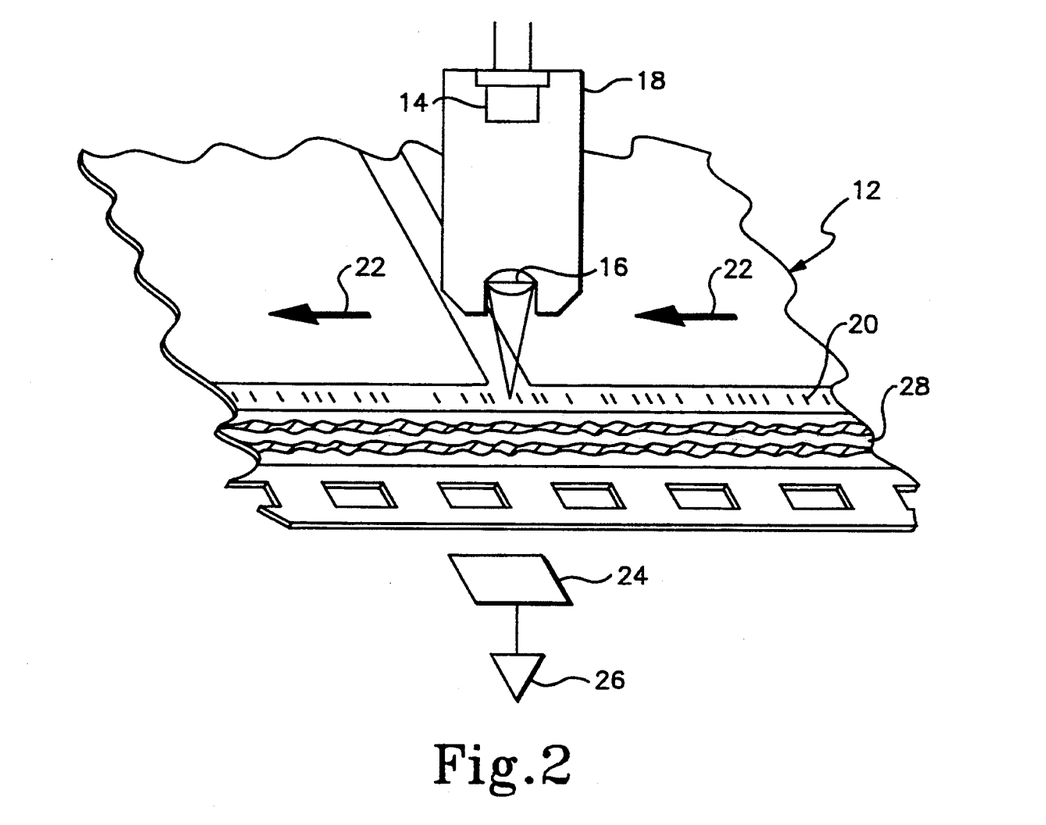
FIG. 2 is a simplified fragmentary perspective view showing a system for reading the digital time code from the film.

A time code readout system is illustrated in FIG. 2. The release film print 12 passes under a time code reading head before advancing to the projector aperture. The reading head illuminates the digital time code area with light that is absorbed by the developed film dyes. A high efficiency red light emitting diode (LED) 14 is preferably used for this purpose. The LED 14 is imaged onto the time code track by a lens 16, preferably as a 0.005"×0.015" spot; both the LED 14 and the lens 16 are held in a common housing 18. The digital time code track is indicated by numeral 20, with the film moving in the direction of arrows 22.

Light passing through the time code track 20 falls upon a photocell 24, the output of which is amplified by an amplifier 26 to provide the digital time code signal used in audio playback. With the time code positioned on the film as described above, its reading is unaffected by the analog sound track 28.

Figure 3:
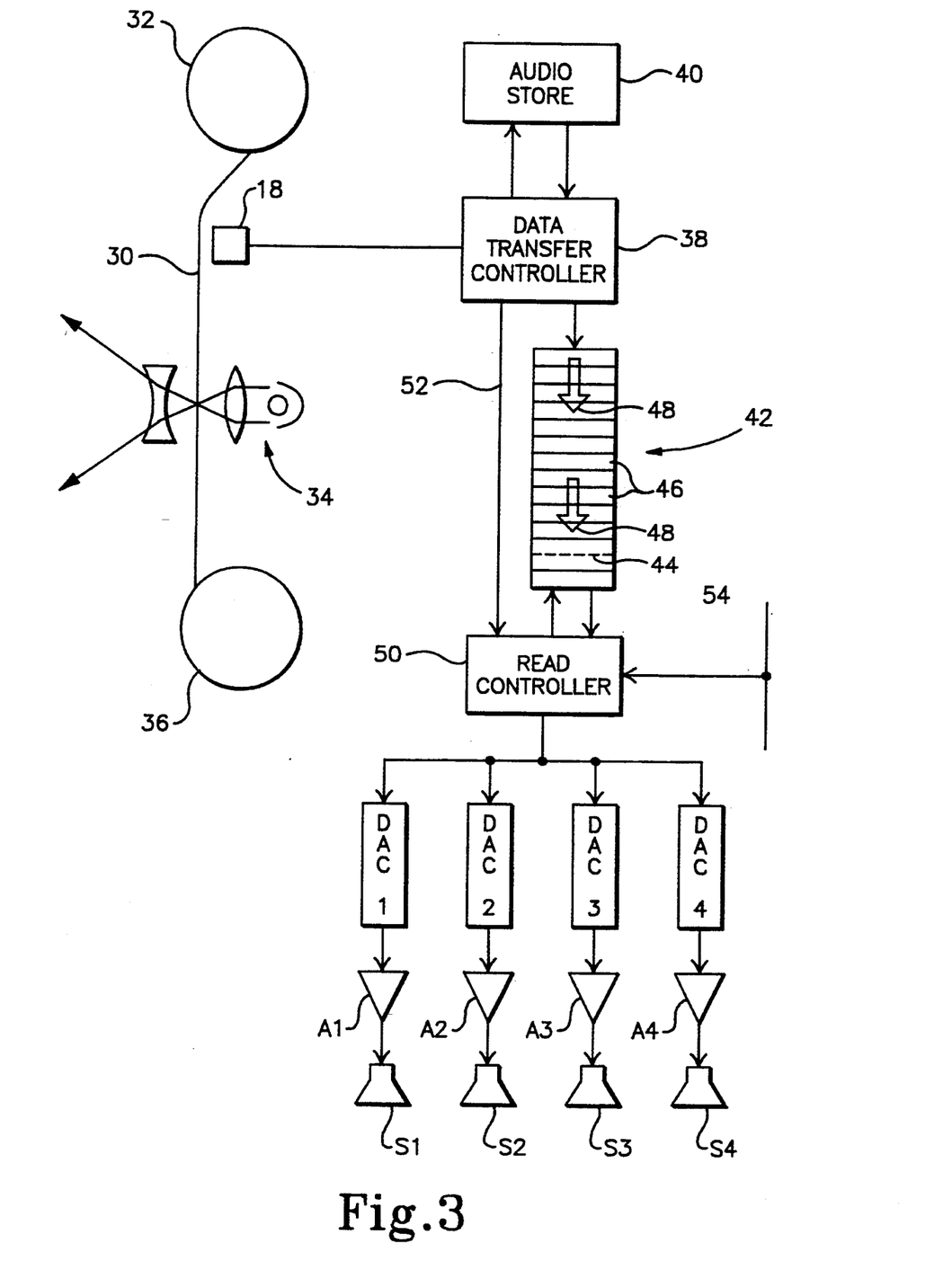
FIG. 3 is a block diagram illustrating a motion picture digital sound system in accordance with the invention.

A preferred embodiment of the invention is shown in FIG. 3. The motion picture film 30 that includes the time code is advanced from a play out reel 32 past the time code reading head 18 and the projector 34 to a take up reel 36. The projector 34 is positioned at a known distance from the time code reader 18, so that the time required for the film to travel from the time code reader to the projector with a normal film advancement speed is precisely known. As described below, the present invention provides for an accurate synchronization of the sound playback with the projected film image, provided the projector remains synchronized to the AC mains.

The time code information from reading head 18 is transmitted to a data access controller such as the microprocessor controller 38, which in the preferred embodiment is an IBM ® PC AT computer that receives the time code data via an input port. The computer 38 manages all of the system's necessary data transfers.

The sound for the movie is stored in a digital audio store 40. In the preferred embodiment this is a CD ROM which is driven by a suitable drive such as a Toshiba XM3300 CD ROM drive, via an SCSI host adapter. Other types of digital data stores could also be used, such as a hard disk drive, a magneto-optic drive (a laser read/write system with a performance similar to a conventional hard disk drive), or even a relatively slow access device such as a DAT. The primary requirements for the digital audio store are (1) its access time must be less than the film travel time from the time code reading head 18 to the projector 34, thus assuring that a jump can be made to an out-of-sequence time code within the audio store before the corresponding portion of the film has reached the projector, and (2) the digital audio store's average data rate capacity must be greater than the average data rate at which information is read out of a FIFO memory (described below) for delivery to the system's DACs.

The data transfer controller 38 writes the data that has been read out of audio store 40 into a FIFO memory 42, which is preferably implemented within the microprocessor's conventional RAM memory. A small amount of the FIFO memory, typically about 2 kilobytes, provides data rate buffering between the PCAT system and the DACs, and is preferably implemented at least partially on a separate board that contains the system DACs for convenience in reading out from the FIFO memory; the cache buffer is symbolically represented as being below dashed line 34.

A typical application for a FIFO memory is to receive input data in bursts, but to read out the data at a constant rate. During periods when no input data is received, the data already stored in the memory is progressively read out through its output, with each data byte progressively dropping down through the successive memory cells (represented by bars 46). In this manner the memory "empties" out through its bottom, with the upper memory cells becoming vacant as the readout progresses. The next data burst "fills" the memory, while data continues to be read out at the same rate from its bottom. The flow of information through the memory from "top" to "bottom" is indicated by arrows 48.

The minimum capacity size required for the FIFO memory 42 used in the present invention is equal to the maximum data access time for the audio store 40; the maximum effective FIFO memory capacity for any particular readout rate is equivalent to the film travel time from the time code reading head 18 to the aperture of the projector 34. Any additional FIFO memory capacity will not be utilized. As an example, in a typical theater installation that uses two track digital audio with a one second time of film travel from the time code reader head 18 to the projection aperture, the FIFO memory 42 would have to be only 176.4 kilobytes long if a 44.1 kilohertz digital audio sample rate is used. An even smaller memory can be used if the data transfer controller 38 can access the digital audio store 40 rapidly enough.

Data is read out from the bottom of the FIFO memory 42 by a read controller 50 that transfers data out at a constant rate. To operate the system, data transfer controller 38 simply turns on the FIFO memory read controller 50 via a control line 52 as the first picture frame arrives at the aperture of projector 34. The theater projector is powered from an AC mains 52, and the readout of data from the FIFO memory 42 is phase locked to the AC mains signal. This technique eliminates the prior use of the time code signal for a positive synchronization of the audio playback to the film projection. Rather, the time code signal is now used simply to assure that the proper audio data is supplied to the input of the FIFO memory 42. By synchronizing the reading out of data from the FIFO memory to the AC mains, which also operates the synchronized motor used in the projector, synchronization between the readout of the digital audio signal and the projection of the film is assured.

The digital sound signal read out from the FIFO memory 42 is transmitted by the read controller 50 to DACs for the various theater speakers, illustrated as DACs 1-4 for a four-speaker theater; a single DAC with a multiple output could also used. The signals are decoded in the usual fashion and amplified by amplifiers A1-A4 for playback in the theater speakers S1-S4.

Figure 4:
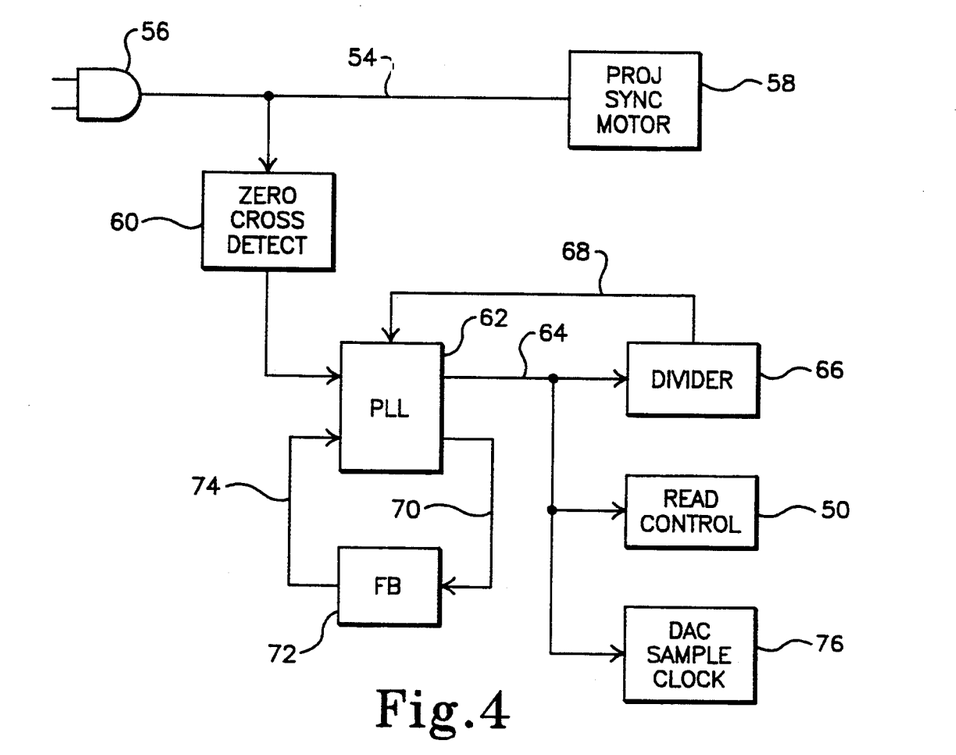
FIG. 4 is a block diagram of a phase locked loop that is preferably used to synchronize both the digital data readout from the system and the theater projector to an AC mains.

A phase locked loop that is used to synchronize a readout from the FIFO memory 42, and also the DAC sampling, with the operation of the projection system is shown in FIG. 4. The AC mains 54 is illustrated as a power line with a plug 56 for insertion into a wall socket. The phase locked loop itself is of conventional design; it may be implemented for example with an HCT4046A Signetics Inc. phase locked loop with VCO.

The AC mains signal on line 54 powers the synchronous motor 58 of the projector, and is also applied to a zero crossing detector 60 whose output is a 60 Hz square wave (in the United States) that is applied to the signal input of the phase comparator used in the phase locked loop element 62. The output of the voltage controlled oscillator (VCO) within the element 62 appears on line 64 and is transmitted to a frequency divider chain 66, typically implemented as a counter. The frequency divider output is transmitted over line 68 to the comparator input of element 62. A phase comparator output from element 62 is applied over line 70 to a feedback circuit 72 that control the dynamic behavior of the phase locked loop. The output of the feedback circuit 72 is applied to the VCO control input via line 74.

The VCO output on line 64 is directed to both the FIFO memory's read controller 50, and to the sample clock 76 for DACs 1-4. This output is constant and synchronized with the AC mains signal, so that the output from the FIFO memory is obtained at a constant rate without any jumps in the FIFO memory.

Locking the operation of the DACs and the FIFO memory readout to the AC mains, rather than to the time code read from the film, allows for a more steady and reliable sampling clock if one or more of the time code entries are destroyed or unreadable. By using the time code to control the input of data into the FIFO memory, and the AC mains signal for continuous synchronization, a much more robust system is provided; a very stable and reliable output clock is realized even in the absence of a reliable time code. The system continually predicts the expected time codes and simply verifies their presence to assure that the correct data is being placed from the digital audio store into the FIFO memory. The present invention can operate even if a large portion of the time code track is unreadable, since it requires only periodic confirmation of the predicted time code entries to proceed, and the clocking of the information read out from the FIFO memory and the DACs does not rely upon the time code itself. Rather, the output clock for both the DACs and the FIFO memory relies upon the AC mains, which is highly stable and necessarily locked to the projector. This results in greater simplicity and reliability than the prior approaches.

Figure 5A:
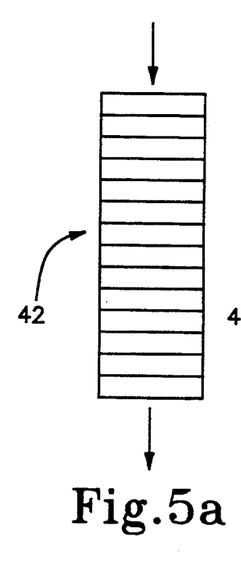
FIGS. 5a–5d are representations of the FIFO memory that illustrate its sequential response to a jump in the digital time code being read.
Figures 5B, 5C, 5D:
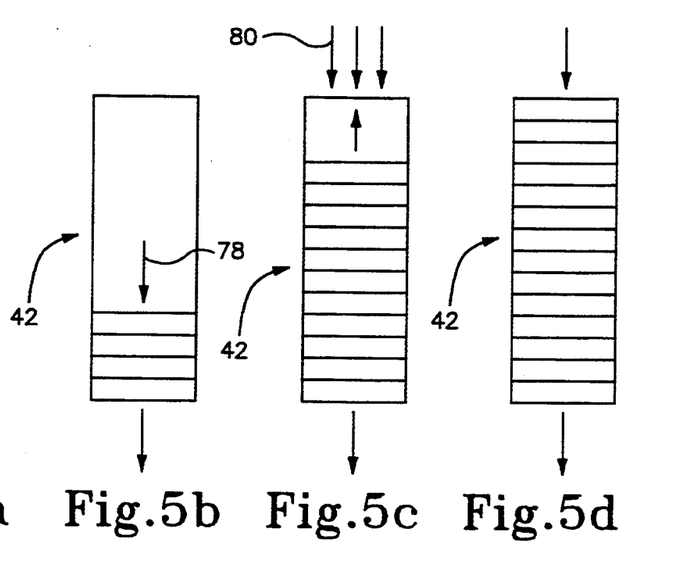

The system's response to a jump in the time code entries read from the film is illustrated in FIGS. 5a-5d. Assume for example that consecutive time code entries 1, 2, 3 are followed by an abrupt jump to 18, 19, 20, skipping the intervening entries. This would occur if the portion of the film corresponding to time codes 4-17 had been damaged and edited out. FIG. 5a illustrates the FIFO memory 52 just before the jump occurs. The memory is full, with data being read in from the "top" and read out from the "bottom" at the same rate. In FIG. 5b the time code jump has just been detected, and the microprocessor controller 38 is in the process of making a corresponding jump within the digital audio store 40 to access the address for time code 18. Until this jump within the audio store has been completed, data continues to be read out of the FIFO memory 14, while no new data is read in. The FIFO memory thus begins to "empty", as indicated by arrow 78. In FIG. 5c the microprocessor controller has completed accessing the new time code location in the digital audio store and the FIFO memory begins to rapidly "fill" with data from the audio store, beginning with the data corresponding to time code entry 18. Since the data transfer capability from a base digital store, such as a CD ROM, is greater than the rate at which data is being removed from the FIFO memory 42, the FIFO memory can refill with data from the audio store much faster than the data already in the memory is read out; this rapid input of data is indicated by the multiple arrows 80. Furthermore, since the maximum random access time for the base digital store is less than the film travel time from the time code read head to the projector's aperture, there is no danger of the FIFO memory coming close to emptying. The memory is rapidly stabilized once it has been refilled, as illustrated in FIG. 5d, with data once again read out at the same rate as it is read in.

Figure 6A:
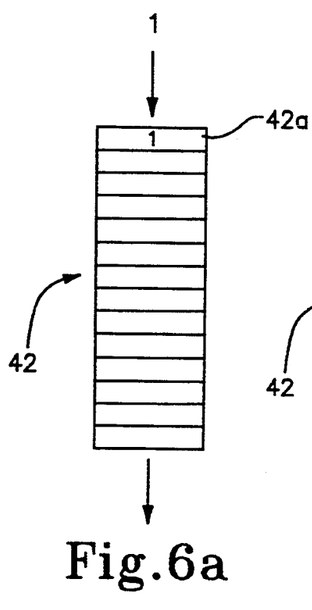
FIGS. 6a–6f are renderings of the FIFO memory that illustrate its sequential response to missing time code entries.
Figure 6B:
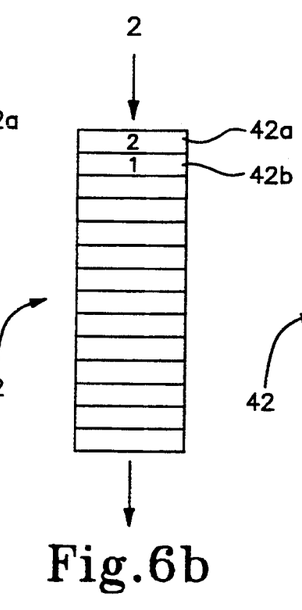
Figure 6C:
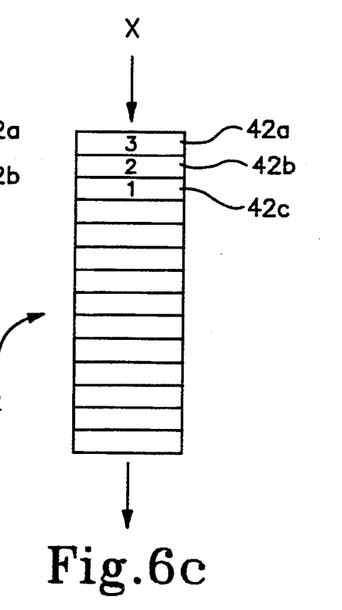
Figures 6D, 6E, 6F:
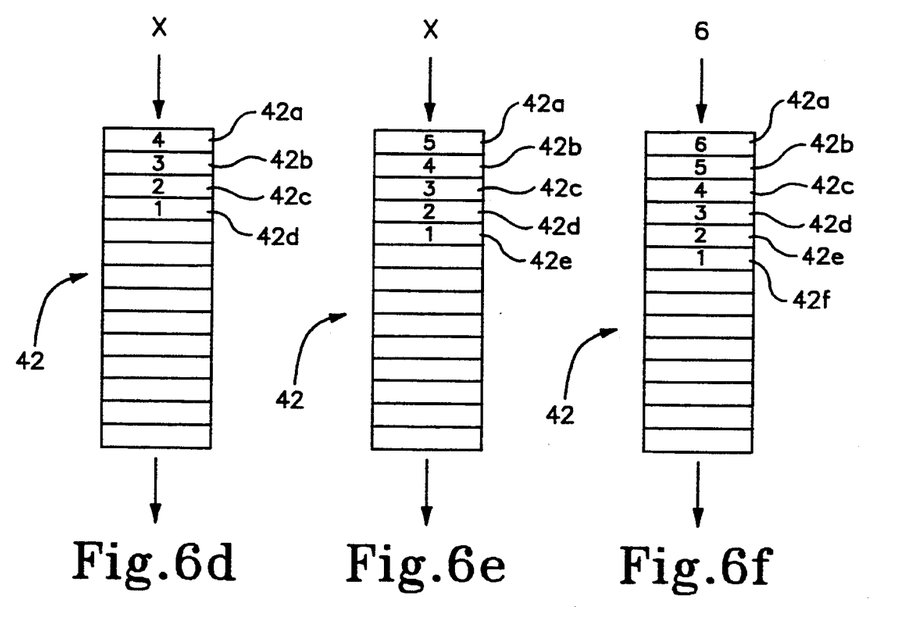

The manner in which the system accommodates to one or more unreadable time codes is illustrated in FIGS. 6a–6f. Assume that time codes 1 and 2 are initially read, followed by three illegible time code entries and then time code 6. FIGS. 6a and 6b illustrate that for time codes 1 and 2 data is read out from the FIFO memory 42 at the same rate new data is supplied from the digital audio store. The time code 1 data enters the uppermost memory cell 42a in FIG. 6a, and is "pushed" down to the second cell 42b when the time code 2 data enters cell 42a in FIG. 6b. When the first illegible time code entry is encountered (FIG. 6c), the FIFO memory simply continues to read out at the same uninterrupted rate. Although no time code has been recognized, the data transfer controller 38 is simply programmed to read the data for the next time code in sequence (3) out of the audio store 40 and into the FIFO memory 42. This is illustrated in FIG. 6c, with the data for time codes 1 and 2 pushed down to the third and second memory cells 42c and 42b, respectively. The same operation is repeated for the next two unreadable time code entries (FIGS. 6d and 6e), with the data corresponding to time codes 1–5 occupying the fifth through first memory cells 42e–42a, respectively, after the third unreadable entry (FIG. 6e). When the readable time code entries resume with time code 6 (FIG. 6f), the FIFO memory receives the corresponding data from the audio store without any interruption, and the first six memory cells 42a–42f are loaded with the data corresponding to time code entries 6–1 respectively. If the new time code entry is out of sequence, the data transfer controller simply jumps to the appropriate data in the audio store and transfers it to the FIFO memory. The data transfer controller 38 can be programmed to continue transferring sequential data from the audio store to the FIFO memory for any desired number of unreadable time code entries before entering a fault mode. Until this occurs, data continues to be written into and read out from the FIFO memory at the same continuous rate.

Figure 7:
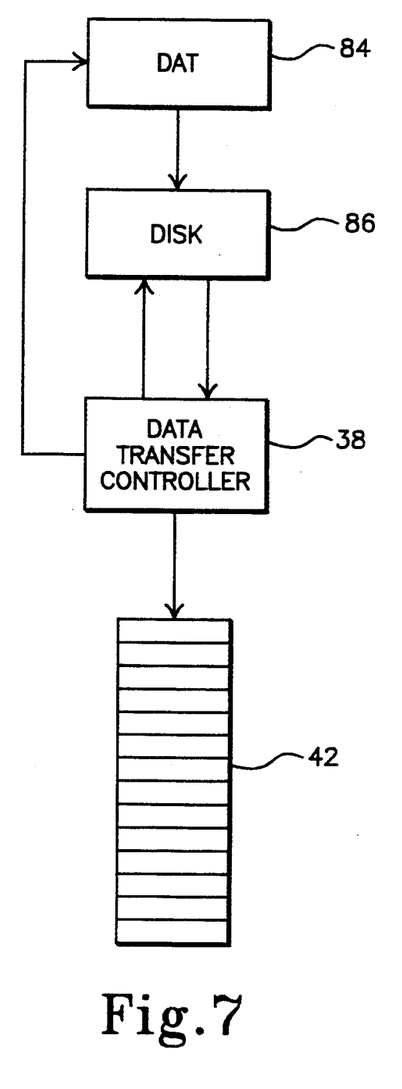
FIG. 7 is a block diagram showing the combination of a DAT and CD as the digital data store.
Figure 8:
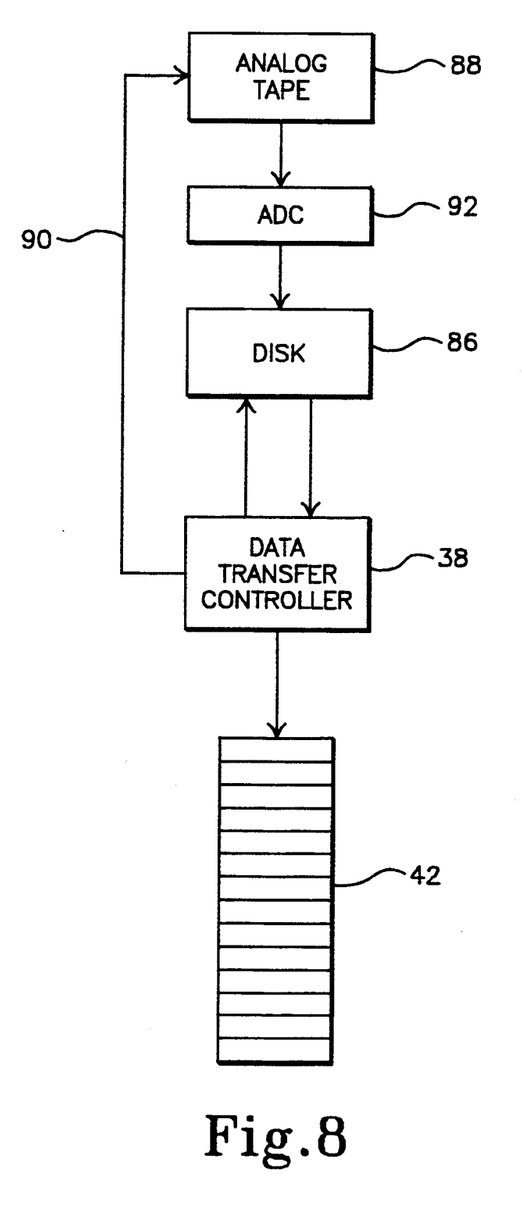
FIG. 8 is a block diagram showing the combination of an analog tape and a CD as the digital data store.

While a rapid access digital audio store is preferred, slower access stores could also be employed. One example is illustrated in FIG. 7, in which the digital sound information is stored in a DAT 84. Assuming the maximum access time for the DAT is too slow to ensure that jumps can be made before the FIFO memory 42 empties or the film advances from the time code reader to the projector aperture, an intermediate rapid access device such as a hard disk 86 could be provided. Digital audio data is transferred from the DAT 84 to the disk 86 under the control of the data transfer controller 38, either in advance of showing the film or while the film is being projected. Jumps in the film are then handled within the rapid access disk 86. This approach could even be extended to an analog audio store such as a conventional analog magnetic tape 88, illustrated in FIG. 8. Under the control of the data transfer controller 38 and control line 90, data is read out from the analog tape, converted to digital form in an analog-to-digital converter (ADC) 92, and loaded into the hard disk 86. Again, time code jumps would be handled within the hard disk.

While the FIFO memory 42 is preferably implemented in the microprocessor's conventional dynamic RAM, other implementations are also possible. For example, a conventional static RAM can be configured into the required FIFO memory using elements such as the Monolithic Memories Inc. 674219 FIFO RAM controller.

The present invention has numerous advantages over the prior approaches described above. It can accommodate jumps in the film of any length, and its memory requirements are smaller and less expensive. The need to perform any address jumps in the FIFO memory is completely avoided, and the synchronization of the sound playback to the AC mains provides for a very robust system. While particular embodiments of the invention have been shown and described, numerous variations and alternate embodiments will occur to those skilled in the art. Accordingly, it is intended that the invention be limited only in terms of the appended claims.

We claim:

1. In a movie projection system having a projector for projecting visual images from a movie film, and means for advancing a movie film past the projector, the improvement comprising a movie sound system that comprises:
   a time code reader for reading a time code on the movie film,
   a digital audio store for storing sound for the movie in a digital format that corresponds to the movie time code,
   a FIFO digital memory having a data input and a data output,
   a digital data transfer controller that responds to the time code read from the movie film by accessing the digital audio store and transmitting to the FIFO memory's data input the digital sound data that corresponds to said time code, the digital data transfer controller's access time being less than the film travel time from the time code reader to the projector, said digital data transfer controller responding to a jump in the time code read by the time code reader by making a corresponding access jump in the digital audio store, without any jump being made in the digital sound data in the FIFO memory,
   means for reading digital sound data out from the FIFO memory data output at a substantially constant rate that corresponds to the film advancement rate, with said FIFO memory providing a substantially continuous and uninterrupted sound data output rate during access jumps in the digital audio store, and digital-to-analog converter (DAC) means for converting the digital sound data read out from the FIFO memory to an analog format, said digital audio store having a data output rate capability that is greater than the rate at which digital sound data is read out from said FIFO memory.

2. The movie projection system of claim 1, wherein the capacity of the FIFO memory is at least as great as the amount of data read out from the FIFO memory during the maximum time required for said data transfer controller to access said digital audio store.

3. The movie projection system of claim 1, wherein said projector and film advancement means are powered from an alternating current (AC) mains, and said means for reading digital sound data out from the FIFO memory includes a readout controller and means for synchronizing said readout controller to the AC mains signal.

4. The movie projection system of claim 3, wherein said synchronizing means comprises a phase locked loop circuit connected between the AC mains and said readout controller.

5. The movie projection system of claim 4, wherein said phase locked loop is also connected to provide a sampling clock signal for said DAC means.

6. The movie projection system of claim 1, wherein said digital data transfer controller includes a dynamic random access memory (RAM), and said FIFO digital memory is implemented in said RAM.

7. The movie projection system of claim 1, wherein said digital audio store comprises a compact disk read only memory (CD ROM).

8. A method of providing an analog sound signal for a movie film from a digital audio store, that stores the movie's sound, the film including a sequential digital time code and the digital audio store storing the sound in a digital format that corresponds to said time code, comprising:

advancing the film, reading the time code from the film as it advances, accessing the digital audio store to read out the digital sound data that correspond to the time code that has been read, loading the digital sound data that have been read out from the digital audio store into a FIFO digital memory, reading out all of the digital sound data that has been loaded into the FIFO digital memory a predetermined period of time after the corresponding time codes have been read from the film, at a substantially constant rate that corresponds to the rate of film advancement, in response to reading at least one jump in the time code sequence, making a corresponding jump in accessing the digital audio store, without any jump in reading out the digital sound data from said FIFO digital memory, and with said FIFO memory providing a substantially continuous and uninterrupted sound data output rate during access jumps in the digital audio store, and converting the digital sound data read out from said FIFO memory to an analog sound signal.

9. The method of claim 8, wherein said film includes at least one unreadable time code, and in response to said unreadable time code the digital audio store is accessed to read out the digital sound data that corresponds to the next time code after the most recent digital sound data read out from the digital audio store.

10. The method of claim 8, wherein power for advancing the film is supplied from an alternating current (AC) mains signal, and the reading out of digital sound data from the FIFO memory is synchronized to said AC mains signal.

11. The method of claim 10, wherein the converting of digital sound data read out from said FIFO memory to an analog format is also synchronized to said AC mains signal.

12. In a movie projection system having a projector for projecting visual images from a movie film, and means for advancing a movie film past the projector, the improvement comprising a movie sound system that comprises:

a time code reader for reading a time code on the movie film, a digital audio store for storing sound for the movie in a digital format that corresponds to the movie time code, a FIFO digital memory having a data input and a data output, a digital data transfer controller that responds to the time code read from the movie film by accessing the digital audio store and transmitting to the FIFO memory's data input the digital sound data that corresponds to said time code, the digital data transfer controller's access time being less than the film travel time from the time code reader to the projector, said digital data transfer controller responding to a jump in the time code read by the time code reader by making a corresponding access jump in the digital audio store, without any jump being made in the digital sound data in the FIFO memory, and means for reading digital sound data out from the FIFO memory data output at a substantially constant rate that corresponds to the film advancement rate, with said FIFO memory providing a substantially continuous and uninterrupted sound data output rate during access jumps in the digital audio store, said digital audio store having a data output rate capability that is greater than the rate at which digital sound data is read out from said FIFO memory.

13. The system of claim 12, wherein said digital audio store stores digital sound data corresponding to an expected sequence of time code signals, and said digital data transfer controller responds to the absence of a time code signal by accessing said digital audio store and transmitting to the FIFO memory's data input the digital sound data that corresponds to the next time code signal in said expected sequence after the most recent digital sound data read out from the digital audio store.

14. The system of claim 12, further including means for receiving a power input from an alternating current (AC) mains, wherein said means for reading digital sound data out from the FIFO memory includes a readout controller and means for synchronizing said readout controller to the AC mains signal.

15. The system of claim 14, wherein said synchronizing means comprises a phase locked loop circuit connected between the AC mains and said readout controller.

16. The system of claim 15, further comprising digital-to-analog converter (DAC) means for converting the digital sound data read out from the FIFO memory to an analog format, wherein said phase locked loop is also connected to provide a sampling clock signal for said DAC means.

17. The system of claim 12, wherein said digital data transfer controller includes a dynamic random access memory (RAM), and said FIFO digital memory is implemented in said RAM.

* * * * *